United States Patent [19]
Komaki

[11] Patent Number: 5,434,373
[45] Date of Patent: Jul. 18, 1995

[54] PEN RECEPTACLE FOR DETACHABLY RECEIVING A PEN

[75] Inventor: Shigeki Komaki, Nara, Japan

[73] Assignee: Sharp Kabushiki Kaisha, Osaka, Japan

[21] Appl. No.: 28,130

[22] Filed: Mar. 9, 1993

[30] Foreign Application Priority Data

Mar. 31, 1992 [JP] Japan ................................. 4-77070

[51] Int. Cl.$^6$ .......................................... H04L 15/08
[52] U.S. Cl. .................................................. 178/87
[58] Field of Search ........................... 178/18, 19, 87; 345/179

[56] References Cited

U.S. PATENT DOCUMENTS

| | | | |
|---|---|---|---|
| 4,927,986 | 5/1990 | Daly | 178/18 |
| 5,180,891 | 1/1993 | Trumbo | 178/18 |
| 5,290,972 | 3/1994 | Someya et al. | 178/18 |

FOREIGN PATENT DOCUMENTS 2-145437 12/1990 Japan .

*Primary Examiner*—Stephen Chin
*Assistant Examiner*—Vijay Shankar
*Attorney, Agent, or Firm*—Birch, Stewart, Kolasch & Birch

[57] ABSTRACT

A pen receptacle for detachably receiving an input pen for use in inputting information into an information processor includes a processor housing having a chamber defined therein for receiving the input pen, a retaining member for retaining the input pen inside the chamber, a locking member for locking the retaining member at a predetermined position where the input pen is retained inside the chamber, and a spring for biasing the retaining member in a direction required for the input pen to be ejected out of the chamber. By this construction, the input pen can be easily removed out of the chamber merely by pushing the input pen locked at the predetermined position.

6 Claims, 2 Drawing Sheets

PEN RECEPTACLE FOR DETACHABLY RECEIVING A PEN

BACKGROUND OF THE INVENTION

1. Field of the Invention

The present invention relates to a pen receptacle for receiving an input pen such as, for example, a stylus for use in inputting information into an information processor or the like.

2. Description of the Prior Art

Japanese laid-open utility model publication (unexamined) No. 2-145437 discloses an electronic appliance having a pen receptacle for accommodating an input pen. When the pen is inserted into the pen receptacle, the pen is securely held in position inside the pen receptacle by a pen retaining mechanism. When the pen is desired to be removed from the pen receptacle, one has to apply a push to a button on the appliance to release the pen retaining mechanism, thereby to allow the pen to be popped out of the receptacle by the action of the biasing force of a spring.

A disadvantage of this kind of pen receptacle is that the button required to release the pen retaining mechanism is exposed, providing an obstacle to the aesthetic feature of the appliance. Another disadvantage is that the appliance body tends to become bulky. Furthermore, the problem arises that just as the button is depressed in an attempt to remove the pen, the pen abruptly jumps out of the pen receptacle and is apt to be damaged.

SUMMARY OF THE INVENTION

The present invention has been developed to overcome the above-described disadvantages and is intended to provide an improved pen receptacle in which an input pen suited for use in inputting information into an information processor can be accommodated and from which the input pen can be easily removed merely by pushing an end of the input pen.

Another object of the present invention is to provide a pen receptacle of the above-described type which does not affect the aesthetic feature of the information processor.

In accomplishing the above and other objects, a pen receptacle according to the present invention detachably receives an input pen therein and comprises a processor housing having a chamber defined therein for receiving the input pen therein, a retaining means for retaining the input pen inside the chamber, a locking means for locking the retaining means at a predetermined position where the input pen is retained inside the chamber, and a biasing means for biasing the retaining means in a direction required for the input pen to be ejected out of the chamber.

By the above-described construction, the input pen can be easily removed out of the chamber merely by pushing the input pen locked at said predetermined position.

When the input pen is inserted into the chamber, the input pen is initially retained by the retaining means and is then locked at said predetermined position by the engagement between the retaining means and the locking means. When the input pen locked at said predetermined position is desired to be removed out of the chamber for use in inputting information into the processor, a single push must be applied to an outer end of the input pen to release the engagement between the retaining means and the locking means. This push is sufficient to allow the input pen to be ejected outwardly from the chamber by the action of the biasing force of the biasing means.

The pen receptacle according to the present invention does not require any button which would otherwise be required for the removal of the input pen then locked inside the chamber, and therefore, the information processor as a whole can be assembled with a minimized number of component parts and, hence, at a reduced cost. Furthermore, since according to the present invention, a single push of the input pen similar to that necessitated to insert the input pen into the chamber allows the input pen to be ejected from the receptacle in pursuit of a retraction of an operator's finger which has been utilized to apply the push, there is no inconvenience that the input pen may be abruptly popped out from the receptacle having separated from the finger while jumping further away from the information processor. Yet, no extra job of pushing the button is required, making it possible to save the labor.

Conveniently, the input pen has a groove and the retaining means has a hook for engagement with the groove. The retaining means retains the input pen by the engagement of the hook with the groove.

Preferably, the retaining means has a recess and the locking member has a finger, a distal end of which is slidably accommodated in the recess. When the distal end of the locking member is positioned at its locked position in the recess, the input pen is locked at said predetermined position.

In another aspect of the present invention, an arrangement for detachably receiving an elongated member comprises a casing having a chamber defined therein for receiving the elongated member, a retaining means for retaining the elongated member in the chamber, a locking means for locking the retaining means at a predetermined position where the elongated member is locked inside the chamber, and a biasing means for biasing the retaining means in a direction required for the elongated member to be ejected out of the chamber.

By this construction, the elongated member can be easily removed out of the chamber merely by the application of an external push to the elongated member then locked at said predetermined position.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
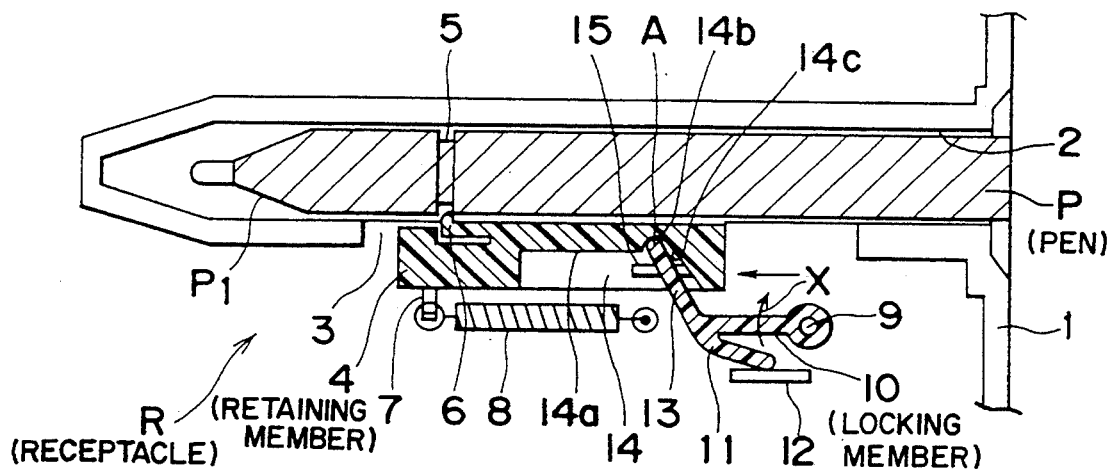
FIG. 1 is a sectional view of a pen receptacle according to the present invention with an input pen locked at a storage position.

Referring now to the drawings, there is shown in FIG. 1 a pen receptacle R according to the present invention in which an input pen P for inputting information into an information processor such as, for example, a computer, is to be accommodated when the input pen P is not in use.

As shown in FIG. 1, the pen receptacle R has an elongated chamber 2 formed in a processor housing 1 for accommodating the pen P and also has a recess 3 formed generally intermediately of the chamber 2. A retaining member 4 for retaining the pen P inside the chamber 2 is horizontally slidably accommodated in the recess 3.

Figure 2:
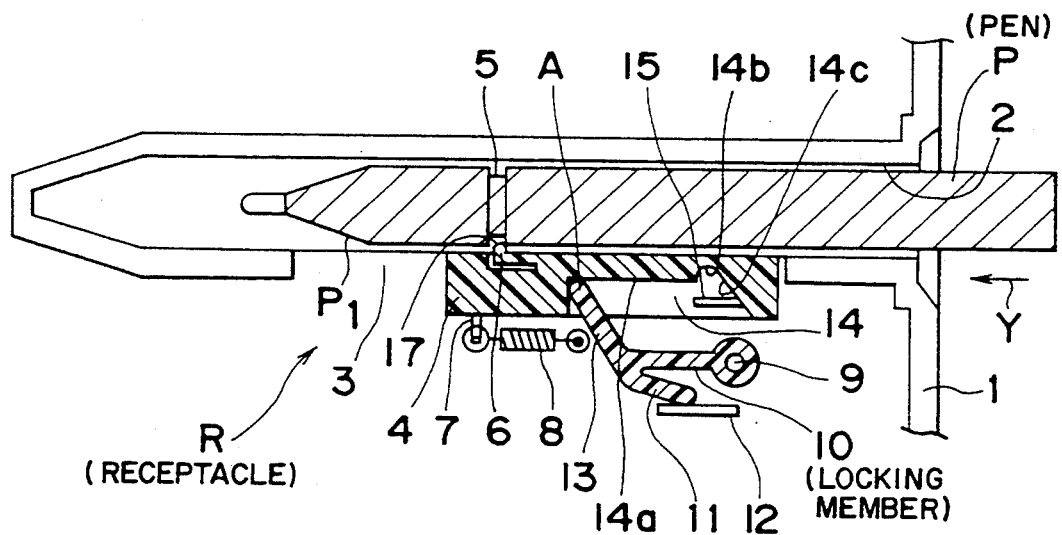
FIG. 2 is a view similar to FIG. 1, but indicating the condition in which the input pen is being inserted into the pen receptacle.
Figure 3:
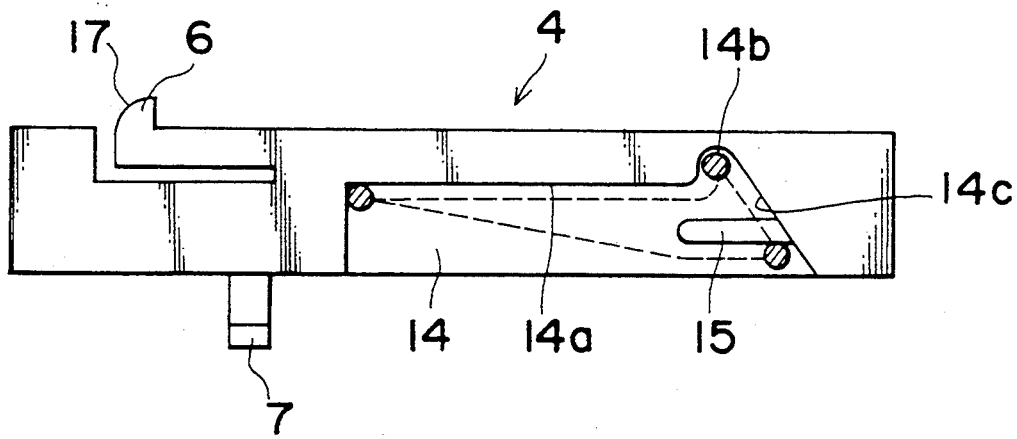
FIG. 3 is an elevational view of a retaining member mounted in the pen receptacle of FIG. 1.

The pen P has an annular groove 5 formed at a portion thereof spaced a distance axially inwardly from a pointed end thereof, as shown in FIG. 2, and the retaining member 4 has a resilient hook 6 as best shown in FIG. 3. When the pen P is inserted generally halfway into the chamber 2, the hook 6 of the retaining member 4 is engaged in the annular groove 5 of the pen P. The retaining member 4 has a projection 7 formed at a location opposite to the hook 6. A spring 8, disposed below the retaining member 4, has one end connected to the projection 7 of the retaining member 4 and the other end connected to the processor housing 1, and applies a biasing force to the retaining member 4 to urge the latter in a direction counter to the direction of insertion of the pen P.

Figure 5:
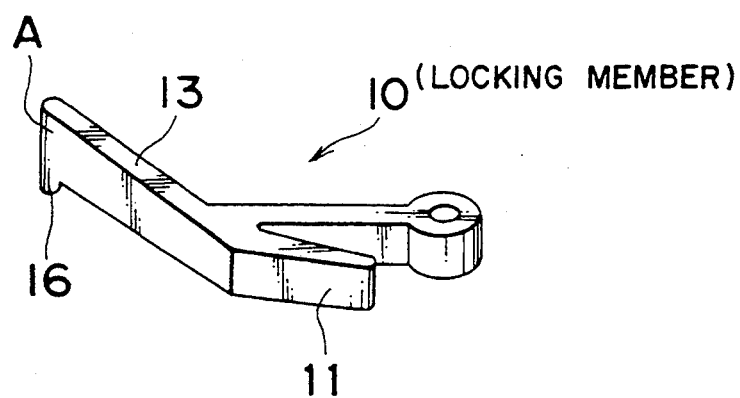
FIG. 5 is a perspective view of a locking member mounted in the pen receptacle for locking the input pen at the storage position.

A locking member 10 is pivotally mounted on a pin 9 secured to the processor housing 1. As best shown in FIG. 5, the locking member 10 has first and second fingers 11 and 13 opposite to each other. The first finger 11 is elastically yielded in contact with a support 12 secured to the processor housing 1, thereby biasing the locking member 10 in a direction shown by an arrow X. A distal end A of the second finger 13 is accommodated in a side recess 14 formed in the retaining member 4 and is always biased against a bottom surface of the side recess 14.

Figure 4:
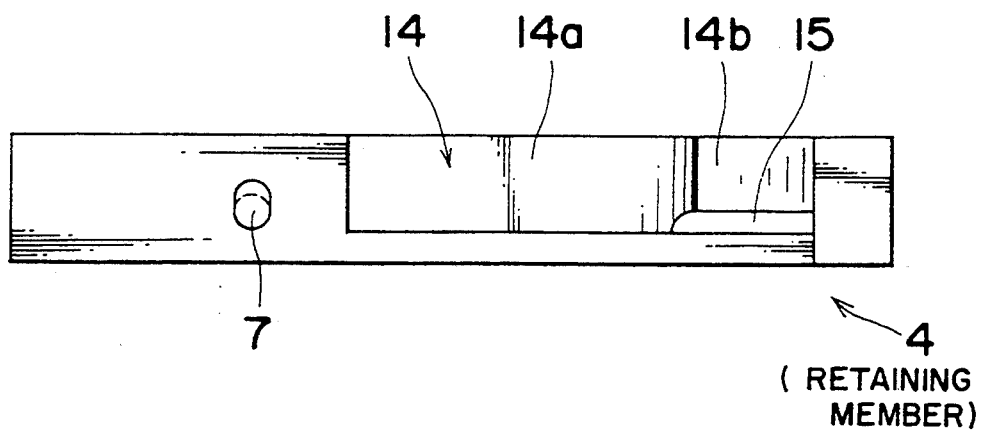
FIG. 4 is a bottom plan view of the retaining member of FIG. 3.

The side recess 14 is delimited by a generally smooth horizontal plane 14a lying generally parallel to the direction of insertion of the pen P, a groove 14b, and an inclined plane 14c as shown in FIGS. 3 and 4. A horizontally extending projection 15 having a generally smooth surface is formed on a side wall of the side recess 14 adjacent the inclined plane 14c.

The operation of the pen receptacle R of the above-described construction is discussed hereinafter with reference to FIGS. 1 and 2.

When the pen P is not accommodated in the chamber 2, the retaining member 4 is held at a rightmost position shown in FIG. 2 by the force of the spring 8. At this moment, the distal end A of the second finger 13 of the locking member 10 is in abutment with the leftmost end wall continued to the horizontal plane 14a and forming the side recess 14.

When the pen P is inserted into the chamber 2 in a direction shown by an arrow Y, an outwardly tapered shoulder P1 thereof collides against the hook 6 of the retaining member 4, causing the hook 6 to be yielded against its own resiliency to pass the pen P thereover. When the pen P is further pushed, the hook 6 is brought into engagement with the annular groove 5 of the pen P, as shown in FIG. 2, by the action of its own resiliency. Therefore, a continued insertion of the pen P further into the chamber 2 is accompanied by a corresponding movement of the retaining member 4 together therewith in the direction of the arrow Y. However, because the locking member 10 is mounted on the stationary pin 9, the distal end A of the second finger 13 thereof slides in contact with the horizontal plane 14a and is then received into the groove 14b. In this way, the pen P is locked at the storage position inside the chamber 2. Therefore, even if an operator withdraws his hand from the pen P, the retaining member 4 can no longer move rightwards from its locked or storage position at which the distal end A of the second finger 13 of the locking member 10 is engaged in the groove 14b of the retaining member 4.

The length of the pen P is appropriately selected such that when the pen P is positioned inside the chamber 2 as shown in FIG. 1, the rear end thereof is held in flush with the external surface of the processor housing 1. Such appropriate selection prevents the pen P, then held at its storage position, from protruding from the processor housing 1.

When the rear end of the pen P resting at its storage position is pushed in the direction of the arrow Y in readiness for the removal of the pen P out of the chamber 2, the distal end A of the second finger 13 of the locking member 10 is moved obliquely downwards along the inclined plane 14c of the retaining member 4. Because the locking member 10 has a lateral projection 16 integrally formed therewith on the distal end A of the second finger 13 thereof, as best shown in FIG. 5, further downward movement of the distal end A of the second finger 13 along the inclined plane 14c causes the lateral projection 16 to pass over the horizontally extending projection 15 formed on the side wall of the side recess 14, thereby allowing the second finger 13 to come to a position disengaged from the groove 14b. When the operator subsequently stops pushing the pen P, the retaining member 4 is moved rightwards by the biasing force of the spring 8, and hence, the distal end A of the second finger 13 of the locking member 10 slides along the horizontally extending generally smooth projection 15 without obliquely upwardly moving along the inclined plane 14c towards the groove 14b.

Thereafter, the distal end A of the second finger 13 is landed on and slides leftwards in contact with and along the generally smooth horizontal plane 14a of the side recess 14. The retaining member 4 together with the pen P is moved rightwards until the distal end A of the second finger 13 of the locking member 10 reaches the position shown in FIG. 2.

During such movement of the retaining member 4 together with the pen P, because the operator keeps his finger in contact with the rear end of the pen P, it never occurs that the pen P may be abruptly popped out of the chamber 2. Even if the operator does not touch the rear end of the pen P at the time the retaining member 4 and the pen P come to the position shown in FIG. 2, the pen P does not jump out of the chamber 2 because the hook 6 is in engagement with the annular groove 5 of the pen P.

Thereafter, when the operator forcibly pulls the pen P in a direction counter to the direction of the arrow Y, the engagement of the hook 6 with the annular groove 5 of the pen P is released, and therefore, the pen P can be easily removed out of the chamber 2 and, hence, out of the pen receptacle R. The reason for this is that the hook 6 has a smoothly rounded or tapered rear face 17, as best shown in FIG. 3. Alternatively, one side wall of the annular groove 5 may be rounded or tapered.

As is clear from the above, according to the present invention, the pen P locked at its storage position can be easily removed out of the pen receptacle R merely by pushing the pen P. Furthermore, the pen receptacle R according to the present invention does not require any button for releasing a locking means when the pen P is desired to be removed, thus resulting in a reduction in number of parts.

It is to be noted here that although a preferred embodiment of the present invention has been discussed taking the case of an input pen and a processor housing having a chamber defined therein for receiving the input pen, the input pen and the processor housing may be replaced by an elongated member analogous to the input pen and a casing having a chamber defined therein for receiving the elongated member, respectively.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A pen receptacle for detachably receiving an input pen for use in inputting information into an information processor, said pen receptacle comprising:
   a housing having a chamber defined therein for receiving the input pen;
   a retaining means for retaining the input pen inside said chamber;
   a locking means for locking said retaining means at a predetermined position where the input pen is retained inside said chamber; and
   a biasing means for biasing said retaining means in a direction required for the input pen to be ejected out of said chamber,
   whereby the input pen is removed out of said chamber by pushing the input pen locked at said predetermined position.

2. The pen receptacle according to claim 1, wherein the input pen has a groove and said retaining means has a hook for engagement with said groove, and wherein said retaining means retains the input pen by the engagement of said hook with said groove.

3. The pen receptacle according to claim 2, wherein said retaining means has a recess and said locking means has a finger, a distal end of which is slidably accommodated in said recess, and wherein when said distal end of said locking means is positioned at its locked position in said recess, the input pen is locked at said predetermined position.

4. An arrangement for detachably receiving an elongated member;
   a casing having a chamber defined therein for receiving the elongated member;
   a retaining means for retaining the elongated member inside said chamber;
   a locking means for locking said retaining means at a predetermined position where the elongated member is retained inside said chamber; and
   a biasing means for biasing said retaining means in a direction required for the elongated member to be ejected out of said chamber,
   whereby the elongated member is removed out of said chamber by pushing the elongated member locked at said predetermined position.

5. The arrangement according to claim 4, wherein the elongated member has a groove and said retaining means has a hook for engagement with said groove, and wherein said retaining means retains the elongated member by the engagement of said hook with said groove.

6. The arrangement according to claim 5, wherein said retaining means has a recess and said locking means has a finger, a distal end of which is slidably accommodated in said recess, and wherein when said distal end of said locking means is positioned at its locked position in said recess, the elongated member is locked at said predetermined position.

* * * * *